United States Patent
Heinrich et al.

(10) Patent No.: US 6,812,841 B2
(45) Date of Patent: Nov. 2, 2004

(54) PASSIVE RFID TAG THAT RETAINS STATE AFTER TEMPORARY LOSS OF POWER

(75) Inventors: Harley Kent Heinrich, Brewster, NY (US); Vijay Pillai, White Plains, NY (US); David E. Dieska, Longwood, FL (US)

(73) Assignee: Intermec IP Corp., Woodland Hills, CA (US)

( * ) Notice: Subject to any disclaimer, the term of this patent is extended or adjusted under 35 U.S.C. 154(b) by 243 days.

(21) Appl. No.: 10/056,398

(22) Filed: Jan. 23, 2002

(65) Prior Publication Data

US 2003/0137400 A1 Jul. 24, 2003

(51) Int. Cl.$^7$ .............................................. G08B 13/14
(52) U.S. Cl. .................. 340/572.1; 340/7.32; 340/10.1
(58) Field of Search .......................... 340/572.1, 693.1, 340/10.1, 7.32; 365/192

(56) References Cited

U.S. PATENT DOCUMENTS

| | | | |
|---|---|---|---|
| 5,214,409 A | | 5/1993 | Beigel |
| 5,283,529 A | * | 2/1994 | Meier ......................... 327/596 |
| 5,850,181 A | * | 12/1998 | Heinrich et al. .......... 340/572.1 |
| 6,173,899 B1 | | 1/2001 | Rozin |
| 6,201,731 B1 | | 3/2001 | Kamp et al. |
| 6,404,325 B1 | * | 6/2002 | Heinrich et al. .......... 340/10.34 |

FOREIGN PATENT DOCUMENTS

| | | |
|---|---|---|
| DE | 39 07 519 | 9/1990 |
| GB | 2 333 495 | 7/1999 |
| JP | 09 135481 | 5/1997 |

* cited by examiner

*Primary Examiner*—Thomas J Mullen
(74) *Attorney, Agent, or Firm*—O'Melveny & Myers LLP

(57) ABSTRACT

The present invention provides an RFID transponder that includes a state holding cell that maintains the present state of the RFID transponder during temporary losses of power. After power is restored to the RFID transponder, the state holding cell restores the present state to the RFID transponder so that transactions with an RFID interrogator can continue without having re-transmit redundant commands. The RFID transponder further comprises an RF front end adapted to receive an interrogating RF signal. An analog circuit is coupled to the RF front end and is adapted to recover analog signals from the received interrogating RF signal. The analog circuit provides state information defining a desired state of the RFID transponder corresponding to the analog signals. A digital state machine is coupled to the analog circuit and adapted to execute at least one command in accordance with the state information. A memory is coupled to the digital state machine and is adapted to store and retrieve digital data responsive to the at least one command executed by the digital state machine. A power capacitor is coupled to the RF front end and derives a voltage rectified from the interrogating RF signal to charge the power capacitor. The power capacitor thereby provides electrical power for the analog circuit, the digital state machine and the memory. The state holding cell is coupled to the analog circuit and the digital state machine and is adapted to maintain the state information during a loss in power provided by the power capacitor due to lapse in receipt of the interrogating RF signal by the RF front end.

24 Claims, 2 Drawing Sheets

PASSIVE RFID TAG THAT RETAINS STATE AFTER TEMPORARY LOSS OF POWER

BACKGROUND OF THE INVENTION

1. Field of the Invention

The present invention relates to radio frequency (RF) transponders, and more particularly, to a radio frequency identification (RFID) transponder that can preserve state information after losing power for a short period of time.

2. Description of Related Art

In the automatic data identification industry, the use of RFID transponders (also known as RFID tags) has grown in prominence as a way to track data regarding an object to which the RFID transponder is affixed. An RFID tag generally includes a semiconductor memory in which digital information may be stored, such as an electrically erasable, programmable read-only memory (EEPROM) or similar electronic memory device. An RFID interrogator or reader may recover the digital information stored in the RFID tag using modulated radio frequency (RF) signals. One such communication technique is referred to as "backscatter modulation," by which an RFID tag transmits stored data by reflecting varying amounts of an electromagnetic field provided by the RFID interrogator by modulating the antenna matching impedance of the tag. The RFID tag can therefore operate independently of the frequency of the energizing field, and as a result, the interrogator may operate at multiple frequencies so as to avoid RF interference, such as utilizing frequency hopping spread spectrum modulation techniques. Since RFID tags using backscatter modulation do not include a radio transceiver, they can be manufactured in very small, lightweight and hence inexpensive units.

RFID tags either extract their power from the electromagnetic field provided by the interrogator (also known as field-powered or "passive" RFID tags), or include their own internal power source (e.g., battery). Passive RFID tags that extract their power from the interrogating field are particularly cost effective since they lack a power source, and can be constructed in smaller package sizes. A drawback of passive RFID tags is that they are susceptible to temporary fluctuations in power level due to variations in the RF environment. More particularly, RFID tags are often utilized in a physical environment that contains various RF absorbing and reflecting surfaces, such as within a manufacturing facility or warehouse. An RFID interrogator may be utilized within such a location to interrogate all of the RFID tags present within the location. The RF absorbing and reflecting surfaces of the location cause multipath cancellation, i.e., the complete cancellation of signals due to the relative amplitude and phase differences of RF components traveling over separate paths. This multipath cancellation is further compounded by the use of a frequency hopping spread-spectrum RF field pattern emitted by the RFID interrogator. As a result of the multipath cancellation, there may be areas within the location in which the RF field strength is essentially zero. Thus, passive RFID tags disposed within or passing through these zero field strength areas will temporarily lose power. In applications in which the RFID tag is expected to maintain its state after it is powered, the temporary loss of power destroys the state information held by the RFID tag.

For example, certain RFID systems include a command set that enables an RFID interrogator to execute a number of functions on plural RFID tags within its range. Using certain commands within the command set, the RFID interrogator may be able to identify multiple RFID tags simultaneously, or may be able to select a subset of RFID tags based on tag memory contents. These RFID tags may further include a state machine that undergoes transitions in the course of processing a command received from the RFID interrogator. When such an RFID tag momentarily loses power due to being within or passing through a zero field strength area, the internal information defining the state is lost. After the RFID tag power is restored, the tag may reinitialize in a state that is different than the state it was in prior to the loss of power. The RFID interrogator will have to repeat the transmission of commands to the RFID tag in order to restore the lost state and complete the desired transaction. This redundant transmission of commands results in an undesirable delay in communication between the RFID interrogator and tag. This communication delay particularly impacts RFID system protocols that identify the presence of multiple RFID tags within an environment, since the delay greatly increases the amount of time necessary to fully identify all of the tags.

In these and other RFID applications, it is very desirable to reduce the amount of time for accomplishing an identification transaction (and thereby increase the identification rate). It would therefore be advantageous to provide an RFID tag that can preserve state information after losing power for a short period of time.

SUMMARY OF THE INVENTION

The present invention provides an RFID transponder that includes a state holding cell that maintains the present state of the RFID transponder during temporary losses of power. After power is restored to the RFID transponder, the state holding cell restores the present state to the RFID transponder so that transactions with an RFID interrogator can continue without having to re-transmit redundant commands.

More particularly, the RFID transponder comprises an RF front end adapted to receive an interrogating RF signal. An analog circuit is coupled to the RF front end and is adapted to recover analog signals from the received interrogating RF signal. The analog circuit provides state information defining a desired state of the RFID transponder corresponding to the analog signals. A digital state machine is coupled to the analog circuit and adapted to execute at least one command in accordance with the state information. A memory is coupled to the digital state machine and is adapted to store and retrieve digital data responsive to at least one command executed by the digital state machine. A power capacitor is coupled to the RF front end and derives a voltage rectified from the interrogating RF signal to charge the power capacitor. In an alternative embodiment, the power capacitor derives the aforementioned rectified voltage from the interrogating RF signal via the analog circuit. Within such alternative embodiment, it should be appreciated that the power capacitor is not connected to the RF front end and is instead coupled between the state holding cell and the analog circuit. In either embodiment, however, the power capacitor provides electrical power for the analog circuit, the digital state machine and the memory. The state holding cell is coupled to the analog circuit and the digital state machine and is adapted to maintain the state information during a loss in power provided by the power capacitor due to lapse in receipt of the interrogating RF signal by the RF front end.

In an embodiment of the invention, the state holding cell further comprises an OR gate have a first input terminal operatively coupled to the analog circuit to receive a voltage corresponding to the state information, a second input terminal coupled to a capacitor, and an output terminal providing the state information to the digital state machine. The voltage charges the capacitor. A diode is coupled between the first input terminal and the second input terminal of the OR gate. A latch may also be coupled between the first input terminal and the output terminal of the OR gate. The latch is operative to restore the voltage corresponding to the state information to the first input terminal following the temporary lapse in receipt of the interrogating RF signal.

A more complete understanding of the passive RFID tag that retains state after temporary loss of power will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for an RFID tag that can preserve state information after losing power for a short period of time. In the detailed description that follows, like element numerals are used to describe like elements illustrated in one or more of the figures.

Figure 1:
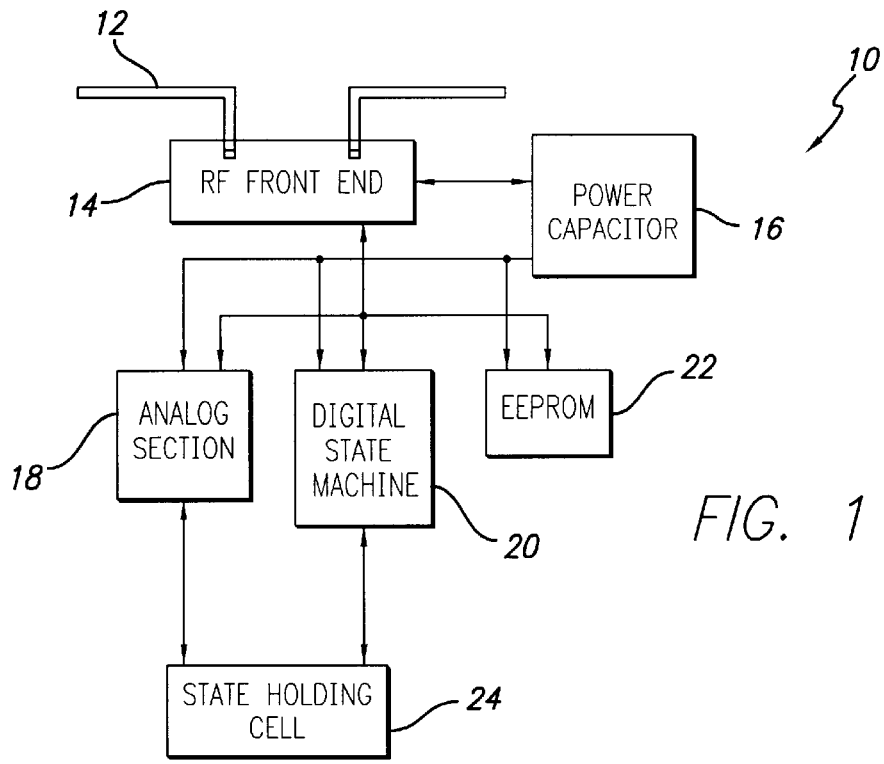
FIG. 1 is a block diagram of an RFID tag having a state holding cell in accordance with an embodiment of the invention.

Referring first to FIG. 1, a block diagram is shown of an exemplary RFID tag 10 in accordance with an embodiment of the present invention. The exemplary RFID tag 10 includes an RF front end 14, a power capacitor 16, an analog section 18, a digital state machine 20, a memory 22, and a state holding cell 24. The RF front end 14 is coupled to an antenna 12, and may include an RF receiver that recovers analog signals that are transmitted by an RFID interrogator and an RF transmitter that sends data signals back to the RFID interrogator. The RF transmitter may further comprise a modulator adapted to backscatter modulate the impedance match with the antenna 12 in order to transmit data signals by reflecting a continuous wave (CW) signal provided by the RFID interrogator. As shown in FIG. 1, the antenna 12 comprises a dipole, but it should be appreciated that other types of antennas could also be advantageously utilized, such as a folded dipole, a meander dipole, a dipole over ground plane, a patch, and the like. The RF field provided by the RFID interrogator presents a voltage on the antenna 12 that is rectified by the RF front end 14 and used to charge the power capacitor 16. The power capacitor 16 serves as a voltage source for the analog section 18, digital state machine 20 and the memory 22 of the RFID tag 10.

The analog section 18 converts analog data signals recovered by the RF front end 14 into digital signals comprising the received commands, recovers a clock from the received analog signals, and converts digital data retrieved from the memory 22 into analog signals that are backscatter modulated by the RF front end 14. The digital state machine 20 provides logic that controls the functions of the RFID tag 10 in response to commands provided by the RFID interrogator that are embedded in the recovered RF signals. The digital state machine 20 accesses the memory 22 to read and/or write data therefrom. The memory 22 may be provided by an EEPROM or like semiconductor memory device capable of maintaining a stored data state in absence of an applied voltage. The RF front end 14, analog section 18, digital state machine 20, and memory 22 communicate with each other through respective input/output (I/O) buses, or alternatively, a common I/O bus may carry all such communications. It should be appreciated that the RF front end 14, analog section 18, digital state machine 20, memory 22, and the state holding cell 24 (discussed below) may be provided by separate circuit elements, or may be sub-elements of a single mixed-signal integrated circuit, such as an application specific integrated circuit (ASIC), field programmable gate array (FPGA), and the like. The state holding cell 24 is coupled between the analog section 18 and the digital state machine 20.

As discussed above, analog signals recovered by the analog section 18 include commands provided by the RFID interrogator that are then executed by the digital state machine 20. Certain ones of these commands cause the RFID tag 10 to change state. Exemplary states for the RFID tag 10 include: (i) ready state, when the tag is first powered up; (ii) identification state, when the tag is trying to identify itself to the RFID interrogator; and, (iii) data exchange state, when the tag is known to the RFID interrogator and is either reading data from memory or writing data to memory. Other tag states may also be included. The state determines how a given command is executed by the RFID tag 10. For example, an initialization command may be executed by an RFID tag in any of the aforementioned states, while a command to lock a byte of memory will generally be executed contingent upon the RFID tag being advanced to the data exchange state. The state may be defined by a digital value (e.g., one or two bits in length). In a conventional RFID tag, a temporary loss of power to the digital state machine after the tag has advanced to the identification state or the data exchange state, such as by the tag passing through a zero RF field region, will cause the RFID tag to return to the ready state upon restoration of power.

In an embodiment of the present invention, the state holding cell 24 provides a storage location for the state information. As the analog section 18 recovers commands that are passed to the digital state machine 20 for execution, state information is also passed to the state holding cell 24. In the event of a temporary loss of power to the RFID tag 10, the digital state machine 20 can restore the state existing prior to the loss of power by accessing the state information contained within the state holding cell 24.

Figure 2:
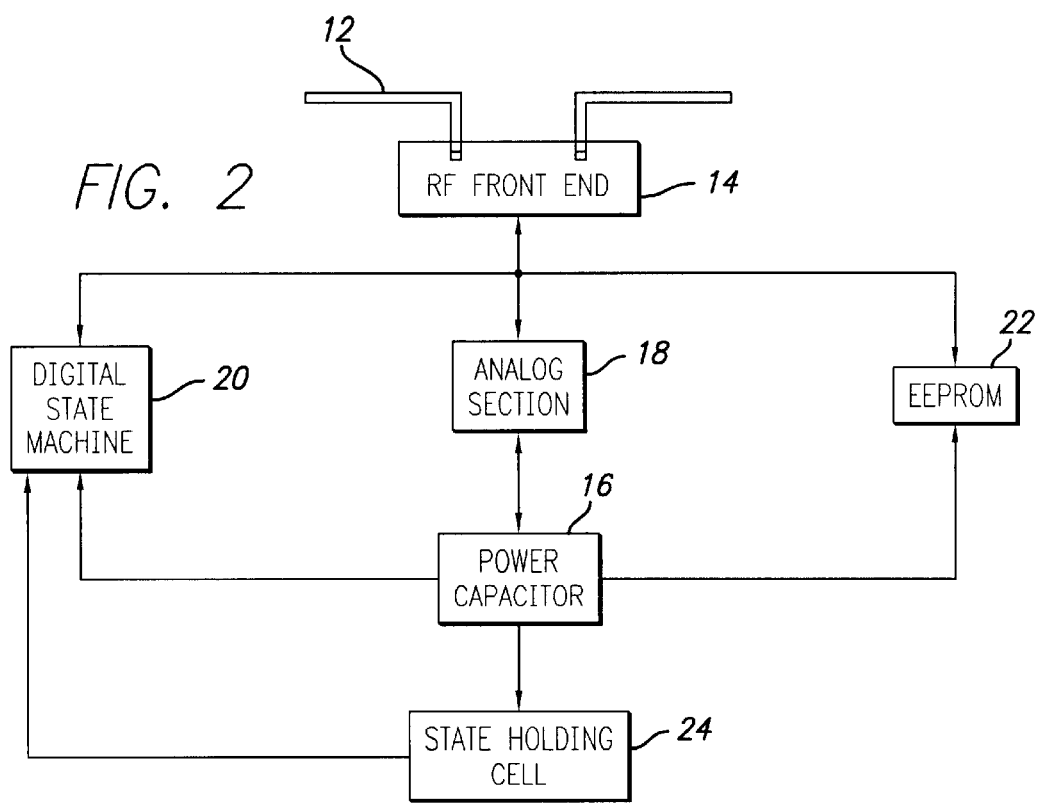
FIG. 2 is a block diagram of an RFID tag having a state holding cell in accordance with another embodiment of the invention.

In an alternative embodiment, the power capacitor 16 is coupled between analog section 18 and state holding cell 24 as shown in FIG. 2. The rectified voltage provided by the RF front end 14 is used as a primary voltage source for the RFID tag 10, while stored power in power capacitor 16 is used as a secondary voltage source in the event of a temporary loss of power. Hence, power capacitor 16 becomes the only voltage source for the analog section 18, digital state machine 20 and the memory 22 of the RFID tag 10 whenever a primary voltage source is not available.

Figure 3:
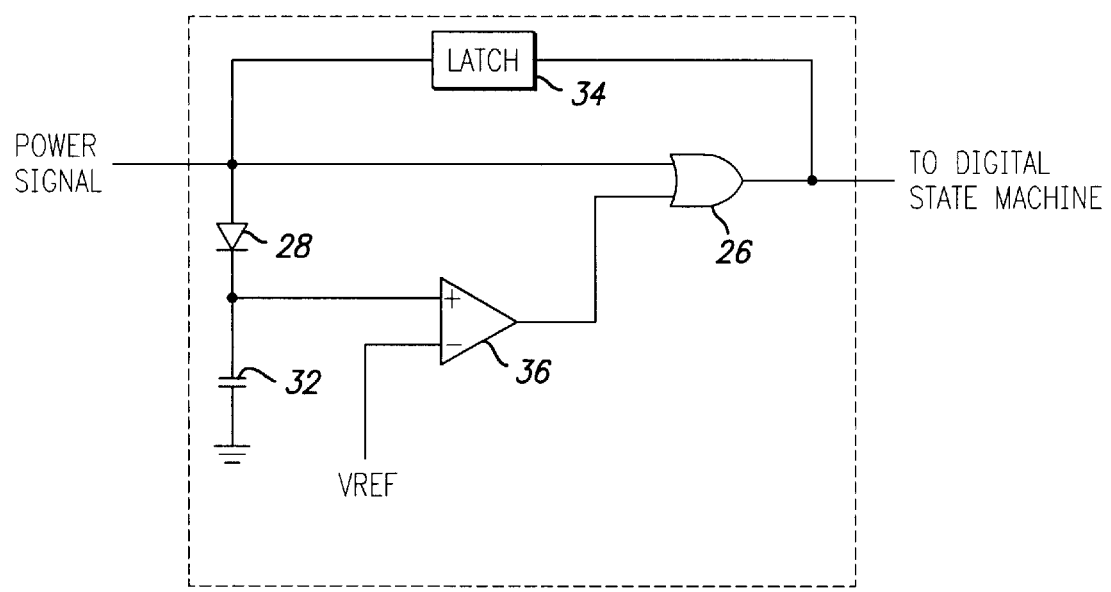
FIG. 3 is an electrical schematic diagram of an exemplary state holding cell.

Referring now to FIG. 3, an electrical schematic diagram of an exemplary state holding cell 24 is provided. The exemplary state holding cell 24 comprises an OR gate 26, a diode 28, a capacitor 32, and an operational amplifier 36. A first input terminal of the OR gate 26 is coupled to a power signal (received either from the analog section 18 as described in FIG. 1 or from the power capacitor 16 as described in FIG. 2) in order to receive one data bit of the state information. The diode 28 is coupled between a first input terminal of the OR gate 26 and the positive input terminal of the operational amplifier 36. The capacitor 32 is coupled between the positive input terminal of the operational amplifier 36 and ground. A reference voltage VREF is then provided to the negative input terminal of the operational amplifier 36 while the output terminal of operational amplifier 36 is connected to a second input terminal of the OR gate 26. An output terminal of the OR gate 26 is coupled to the digital state machine 20 to receive the state information upon the event of a temporary loss of power by the RFID tag 10. In a preferred embodiment of the invention, diode 28 is provided by a p-n junction diode. Although alternative embodiments may substitute Schottky diodes for p-n junction diodes, it should be appreciated that p-n junction diodes are preferred due to their more favorable reverse leakage characteristics. For convenience, the following discussion will apply to a single data bit of the state information, but it should be noted that there would be another circuit identical to that shown in FIG. 3 corresponding to each other data bit of the state information.

When the received power signal corresponds to a data ONE, the OR gate 26 will have a data ONE at the output terminal. The voltage present at the first input terminal of the OR gate 26 will charge the capacitor 32 through the diode 28, until the voltage across the capacitor substantially mirrors the voltage at the first input terminal (minus the small voltage drop across the diode 28). The voltage at the second input terminal of the OR gate 26 (i.e., at the output of the operational amplifier 36) will then also represent a data ONE, but the output terminal of the OR gate 26 will remain at data ONE. In the event of a temporary loss of power to the RFID tag 10, the received power signal applied to the first input terminal of the OR gate 26 will fall to a data ZERO. Nevertheless, the output terminal of the OR gate 26 will remain at data ONE due to the charge on the capacitor 32 that maintains the second input terminal at data ONE via the operational amplifier 36. The diode 28 prevents discharge of the capacitor 32 back through the analog section 18. The duration of time that the state holding cell will maintain the previous state information will be determined by the leakage characteristics of the capacitor 32 and other parasitic elements of the circuit. After power is restored to the RFID tag 10, the digital state machine 20 recovers the state information from the output terminal of the OR gate 26. It should be appreciated that a received power signal corresponding to a data ZERO will result in the output terminal of the OR gate 26 remaining at data ZERO since the capacitor 32 will not be charged.

In a preferred embodiment, it should be appreciated that the operational amplifier 36 is used as a voltage comparator circuit. More specifically, the operational amplifier 36 is used in cases where stray leakage may cause the voltage on capacitor 32 to drop to levels in which OR gate 26 is not activated. In such cases, the reference voltage VREF that is provided to the negative terminal of operational amplifier 36 is used to generate an amplified version of the voltage stored in capacitor 32. In particular, the operational amplifier 36 compares the voltage across the capacitor 32 to the reference voltage VREF. If the voltage across the capacitor 32 is greater than the reference voltage VREF, then the operational amplifier 36 outputs a high voltage corresponding to a data ONE; otherwise, a low voltage corresponding to a data ZERO is output. This output voltage is then provided as input to the second input terminal of the OR gate 26 as described above.

The state holding cell may further include a latch 34 coupled between the first input terminal and the output terminal of the OR gate 26. The latch 34 would be used after power is restored to the RFID tag 10 to return the first input terminal of the OR gate 26 to the data state it was in prior to the loss of power. The latch 34 may be provided by a conventional S-R latch or flip-flop circuit. For a flip-flop circuit, it may be necessary to have a clock signal generated by the digital state machine 20 to trigger the flip-flop to apply the data state of the output terminal of the OR gate 26 to the first input terminal. An S-R latch would not require an additional signal to apply the data state.

Having thus described a preferred embodiment of a passive RFID tag that retains state after temporary loss of power, it should be apparent to those skilled in the art that certain advantages of the described system have been achieved. It should also be appreciated that various modifications, adaptations, and alternative embodiments thereof may be made within the scope and spirit of the present invention. The invention is further defined by the following claims.

What is claimed is:

1. An RFID transponder, comprising:

an RF front end adapted to receive an interrogating RF signal;

an analog circuit coupled to said RF front end and adapted to recover analog signals from said received interrogating RF signal, said analog circuit providing state information defining a desired state of said RFID transponder corresponding to said analog signals;

a digital state machine coupled to said analog circuit and adapted to execute at least one command in accordance with said state information;

a memory coupled to said digital state machine and adapted to store and retrieve digital data responsive to said at least one command executed by said digital state machine a power capacitor coupled to said analog circuit and deriving a voltage rectified from said interrogating RF signal to charge said power capacitor, said power capacitor thereby providing electrical power for said analog circuit, said digital state machine and said memory; and a state holding cell coupled to said digital state machine and being adapted to maintain said state information during a loss in power provided by said power capacitor due to lapse in receipt of said interrogating RF signal by said RF front end.

2. The RFID transponder of claim 1, wherein said state holding cell further comprises an OR gate having a first input terminal operatively coupled to receive a voltage corresponding to said state information, a second input terminal coupled to a capacitor via a voltage comparator circuit having an input terminal and an output terminal, and an output terminal providing said state information to said digital state machine, said capacitor being charged by said voltage.

3. The RFID transponder of claim 2, further comprising a diode coupled between said first input terminal and said input terminal of said voltage comparator circuit.

4. The RFID transponder of claim 3, wherein said diode further comprises a Schottky diode.

5. The RFID transponder of claim 3, wherein said diode further comprises a p-n junction diode.

6. The RFID transponder of claim 2, further comprising a latch coupled between said first input terminal and said output terminal of said OR gate, said latch being operative to restore said voltage corresponding to said state information to said first input terminal following said temporary lapse in receipt of said interrogating RF signal.

7. The RFID transponder of claim 1, wherein said memory further comprises an EEPROM device.

8. The RFID transponder of claim 1, wherein said state information defines plural operating states of said digital state machine.

9. An RFID transponder, comprising:
    means for receiving an interrogating RF signal;
    means for recovering analog signals from said received interrogating RF signal and providing state information defining a desired state of said RFID transponder corresponding to said analog signals;
    means for executing at least one command in accordance with said state information;
    means for storing and retrieving digital data responsive to said at least one command;
    means for providing electrical power for said RFID transponder derived from said interrogating RF signal; and
    means for maintaining said state information during a temporary lapse in receipt of said interrogating RF signal.

10. The RFID transponder of claim 9, wherein said receiving means further comprises an RF front end.

11. The RFID transponder of claim 9, wherein said recovering means further comprises an analog circuit.

12. The RFID transponder of claim 9, wherein said executing means further comprises a digital state machine.

13. The RFID transponder of claim 12, wherein said state information defines plural operating states of said digital state machine.

14. The RFID transponder of claim 9, wherein said storing and retrieving means further comprises a memory device.

15. The RFID transponder of claim 14, wherein said memory device further comprises an EEPROM device.

16. The RFID transponder of claim 9, wherein said maintaining means further comprises an OR gate having a first input terminal operatively coupled to receive a voltage corresponding to said state information, a second input terminal coupled to a capacitor, and an output terminal providing said state information, said capacitor being charged by said voltage.

17. The RFID transponder of claim 16, further comprising a diode coupled between said first input terminal and said input terminal of said OR gate.

18. The RFID transponder of claim 17, wherein said diode further comprises a Schottky diode.

19. The RFID transponder of claim 17, wherein said diode further comprises a p-n junction diode.

20. The RFID transponder of claim 16, further comprising a latch coupled between said first input terminal and said output terminal of said OR gate, said latch being operative to restore said voltage corresponding to said state information to said first input terminal following said temporary lapse in receipt of said interrogating RF signal.

21. A method for operating an RFID transponder, comprising the steps of:
    receiving an interrogating RF signal;
    recovering analog signals from said received interrogating RF signal and providing state information defining a desired state of said RFID transponder corresponding to said analog signals;
    executing at least one command in accordance with said state information;
    storing and retrieving digital data responsive to said at least one command;
    providing electrical power for said RFID transponder derived from said interrogating RF signal; and
    maintaining said state information during a temporary lapse in receipt of said interrogating RF signal.

22. The method of claim 21, wherein said maintaining step further comprises receiving a voltage corresponding to said state information, and charging a capacitor by said voltage.

23. The method of claim 22, further comprising the step of preventing discharge of said capacitor during said temporary lapse in receipt of said interrogating RF signal.

24. The method of claim 22, further comprising the step of restoring said voltage corresponding to said state information following said temporary lapse in receipt of said interrogating RF signal.

* * * * *